United States Patent [19]

Sticht

[11] 4,231,687
[45] Nov. 4, 1980

[54] APPARATUS FOR SEPARATING INDIVIDUAL ASSEMBLY PARTS FROM A COHERENT MASS AND FOR ORIENTING THE INDIVIDUAL PARTS

[76] Inventor: Walter Sticht, Wankhamerstrasse 8, A-4800 Attnang-Puchheim, Austria

[21] Appl. No.: 44,633

[22] Filed: Jun. 1, 1979

Related U.S. Application Data

[62] Division of Ser. No. 826,307, Aug. 22, 1977, abandoned.

[30] Foreign Application Priority Data

Oct. 6, 1976 [AT] Austria .................................. 7402

[51] Int. Cl.³ .............................................. B65G 53/08
[52] U.S. Cl. ...................................... 406/52; 198/953; 406/137
[58] Field of Search ................ 406/137; 198/443, 533, 198/396, 398, 953; 221/163, 164, 166, 167, 169, 170, 200–204; 241/5, 85, 274, 301; 414/112, 116

[56] References Cited

U.S. PATENT DOCUMENTS

| | | | |
|---|---|---|---|
| 3,346,305 | 10/1967 | Heymann | 198/953 |
| 3,625,570 | 12/1971 | Ford | 198/953 |
| 3,679,097 | 7/1972 | Gunter | 198/953 |
| 3,729,096 | 4/1973 | Fitzner et al. | 241/85 |
| 3,730,442 | 5/1973 | Harris | 241/85 |
| 3,900,131 | 8/1975 | Ehrlich | 221/169 |
| 4,035,029 | 7/1977 | Lindstrom et al. | 198/953 |
| 4,063,642 | 12/1977 | Sticht et al. | 198/398 |
| 4,078,994 | 3/1978 | Hazelwood | 198/953 |

*Primary Examiner*—Joseph E. Valenza
*Attorney, Agent, or Firm*—Kurt Kelman

[57] ABSTRACT

An apparatus for singling assembly parts from a coherent mass comprises a rotary drum storing the mass and including a slotted peripheral wall with openings of a width permitting single parts to pass therethrough by gravity and a length permitting a plurality of the parts to pass whereby clusters of the parts resolved by the rotation of the drum from the coherent mass pass through the openings by gravity. A whirlpool chamber is arranged downstream of the rotary drum and has an inlet receiving the clusters from the drum openings through a passageway. Nozzles are arranged at the inlet for directing a tangential jet of gas into the chamber and creating a gaseous whirlpool in the chamber for moving and separating the clusters into individual assembly parts, and restricted outlet pipes communicate with the whirlpool chamber remote from the inlet and are arranged to receive individual assembly parts moved by the gas jet so that the individual parts are oriented along the axis of the outlet pipe.

4 Claims, 1 Drawing Figure

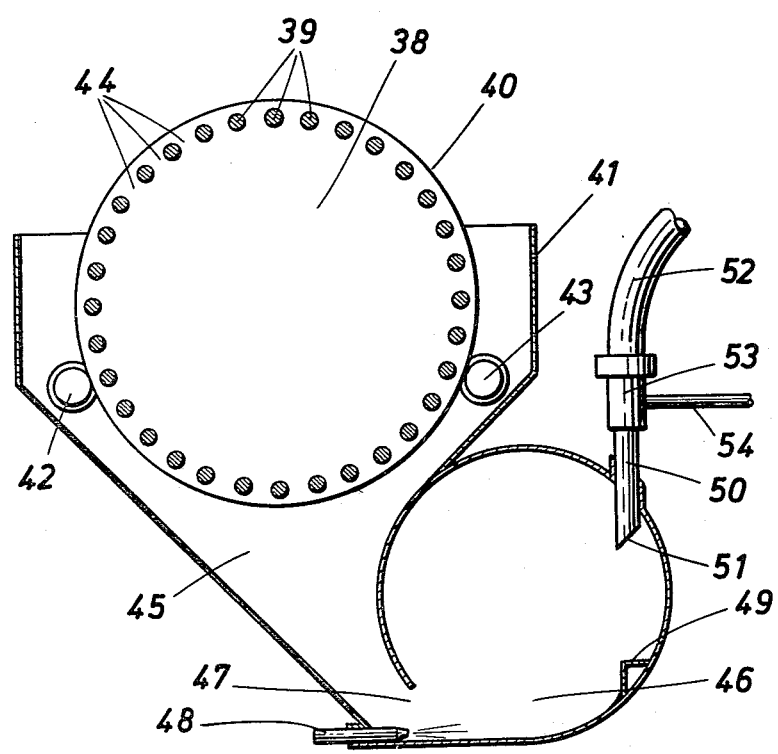

APPARATUS FOR SEPARATING INDIVIDUAL ASSEMBLY PARTS FROM A COHERENT MASS AND FOR ORIENTING THE INDIVIDUAL PARTS

This is a division of Ser. No. 826,307, filed Aug. 22, 1977 now abandoned. Reference is also made to my copending application Ser. No. 037,503 filed May 10, 1979 which is a continuation-in-part of Ser. No. 826,307.

The present invention relates to improvements in an apparatus for separating individual assembly parts from a coherent mass of such parts and for orienting the individual parts, and is especially useful for singling assembly parts of complex shape entangled in a coherent mass and for delivering the singled parts oriented to an assembly station.

In assembly operations using such assembly parts as helical springs, contact and other electrical components, clip, pins, screws, bolts, small tubes, hooks, rings and the like, a major problem exists in delivering single assembly parts to the assembly line from a coherent mass of such parts, in which the parts randomly adhere to each other and may be completely entangled, as in the case of coil springs, hooks or complex wire clips, for example. Particular problems arise where assembly parts of complex configurations are heavily entangled, which requires that the entangled mass of parts by resolved in a first operating stage into clusters of a relatively few parts, which may still be at least partially entangled, whereupon they are singled in a second operating stage before the separated individual parts are oriented in a third stage.

In copending U.S. Pat. No. 4,063,642, of which I am a joint inventor, it has been proposed to separate individual assembly parts from a coherent mass of the parts by first separating the mass into small clusters by a brush conveyor which moves these small clusters of parts into a whirlpool chamber where the clusters are resolved into single parts by a jet of air which ejects the single parts from the chamber and moves them to an orienting station where the single parts are oriented and conveyed to an assembly line or the like. The brush conveyor in the first stage does not always work efficiently for parts with multiple bends or which form initially loose clusters having many empty cavities in their interior, where the crush conveyor sometimes tends to make the clusters of parts denser rather than resolving them.

Rotary screen drums for sorting or classifying particulate bulk material are also known for separating different sizes of the particulate material and for distributing the classified material coming from the drum. Thus, a slatted rotary cylinder for separating the leaves of herbs and the like from seeds and twigs is disclosed in U.S. Pat. No. 3,729,096. U.S. Pat. No. 3,487,911 discloses an apparatus for distributing such bulk material as wood fibers or chips, which comprises a rotary cylinder whose peripheral wall is constituted by peripherally spaced bars.

It is the primary object of this invention to provide a simple and universally effective apparatus capable of effectively and efficiently separating even assembly parts of the most complex configuration from a coherent mass thereof, including a heavily entangled mass, and orienting the individual parts after they have been singled in a substantially uniform flow of single parts.

The above and other objects are accomplished in accordance with the invention with an apparatus comprising a rotary drum for storing the coherent mass of assembly parts, a housing of circular cross section defining a whirlpool chamber arranged downstream of the rotary drum and having an inlet, a transfer passageway leading from the rotary drum to the inlet of the whirlpool chamber, nozzle means arranged at the inlet of the housing for directing a jet of gas into the whirlpool chamber in a direction substantially tangential relative to the circle defined by the housing, and a restricted tubular outlet means communicating with the whirlpool chamber remote from the inlet. The rotary drum includes a plurality of axially extending elongated support members for the stored mass of the parts, the support members constituting the peripheral wall of the drum and the support members being peripherally spaced from each other to define slot-shaped discharge openings therebetween. The openings have a width permitting single ones of the parts to pass therethrough by gravity and a length permitting a plurality of the parts to pass whereby clusters of the assembly parts resolved by rotation of the drum from the coherent mass may pass through the openings by gravity. The housing inlet has a dimension permitting the clusters of assembly parts to be received and passed therethrough, the inlet being in communication with the peripheral drum openings through the transfer passageway and the whirlpool chamber having an axis extending perpendicularly to the circular cross sectional plane of the housing. The tangential jet of gas creates a gaseous whirlpool in the chamber for moving and separating the clusters into individual assembly parts. The tubular outlet means is arranged to receive individual ones of the assembly parts moved by the gas jet and has a diameter permitting only single assembly parts to pass therethrough and to be oriented along the axis of the outlet means in a direction of the smallest dimension of the assembly parts. Moving gas from the jet conveys the oriented assembly parts singly through the outlet means.

It is an essential concept of the present invention that rotary screen drums previously used for classifying bulk material may effectively replace a brush conveyor in the apparatus for U.S. Pat. No. 4,063,642 to disentangle complexly shaped assembly parts so that entangled masses of such parts are resolved into small enough clusters for singling by air blasts. This resolution of the entangled mass into clusters is attained in the rotary drum because the rotation of the drum, which may preferably be reciprocatory and/or pulsating, causes portions of the mass constantly to shift relative to each other and to the support members, thus causing the parts to become disentangled.

The above and other objects, advantages and features of the invention will become more apparent from the following detailed description of a now preferred embodiment thereof, given by way of illustrative example and taken in conjunction with the single FIGURE of the accompanying drawing showing the apparatus schematically in transverse cross section.

The drawing shows rotary drum 40 for storing a coherent mass of assembly parts and including a plurality of axially extending elongated support members 39 illustrated by way of example as round rods for containing the stored mass of parts (not shown). Support members 39 constitute the peripheral wall of drum 40 and interconnect end walls 38 of the drum. The support members are pierpherally spaced from each other to define slot-shaped discharge openings 44 therebetween. The end walls of drum 40 are frictionally supported by pairs of rollers 42, 43, one of the rollers being an idler roller while the other roller is suitably driven to rotate the drum either continuously, intermittently, in one direction or in alternatingly opposite directions. The drum may be charged with the coherent mass of assembly parts through an opening in one of the end walls. It is also possible to journal the drum for rotation about an oblique axis, for instance by supporting one end wall 38 on a pair of rollers 42, 43 which are mounted on a higher level than the other pair of rollers supporting the other end wall. In this case, the charge opening is arranged in the higher end wall so that the masses of assembly parts may be charged into the drum while it is rotated, the charged masses of parts sliding down the obliquely positioned drum.

Discharge openings 44 have a width permitting single ones of the parts to pass therethrough by gravity and a length permitting a plurality of the parts to pass whereby clusters of assembly parts resolved by rotation of the drum from the coherent mass pass through the openings by gravity. Generally speaking, this width is understood to constitute a cross section of the opening which just permits passage of single parts while the length is sufficient to permit a plurality of such parts to pass side-by-side so that the openings will never be completely clogged. The cross section of the opening may be smaller than the smallest projected section of a multiangled or bent part. A hook is a simple example of such a part and the opening width for such a hook needs to exceed the cross section of one leg of the hook only by as much as will permit a turning and passage of the bight portion through the opening after passage of the one leg of the hook.

A housing of circular cross section defining whirlpool chamber 46 is arranged downstream a rotary drum 40 and has inlet 47 of a dimension permitting the clusters of assembly parts to be received and passed therethrough. Inlet 47 is arranged at the bottom of chamber 46 which has an axis extending perpendicularly to the circular cross sectional plane of the housing generally in the same direction as the axis of drum 40. A transfer passageway leads from the rotary drum to inlet 47 of whirlpool chamber 46 whereby the inlet is in communication with peripheral drum openings 44. In the illustrated embodiment, drum 40 is mounted in openended funnel-shaped housing 41, in which rollers 42, 43 are journaled to support the drum in housing 41, and whose neck portion 45 constitutes the transfer passageway for the clusters of a few entangled parts coming from slot-shaped openings 44 and entering inlet 47 by gravity.

In the illustrated embodiment, whirlpool chamber 46 is defined by a cylindrical housing having a horizontal axis and into which neck portion 45 of the passageway merges through inlet opening 47. Nozzle means 48 consisting of a bank of blast nozzles is arranged at inlet 47 of the housing for directing a jet of gas, such as air, into whirlpool chamber 46 in a direction substantially tangential to the circle defined by the cylindrical housing. The gas jet creates a gaseous whirlpool in chamber 46 for moving and separating the clusters entering through inlet 47 into individual assembly parts traveling in an approximately circular path substantially along the cylindrical wall of the whirlpool chamber by means of the air streams coming from the blast nozzles.

Separation of the assembly parts from each other while they are moved through the chamber is enhanced by the arrangement of baffle means in chamber 46 in the path of the moving assembly parts between inlet 47 and outlet means 50. One such baffle means 49 has been illustrated and is shown as consisting of an abutment step projecting inwardly from the cylindrical housing so as to intercept the moving parts and, through the impact of the parts on the baffle means, to aid in separating entangled ones of the assembly parts from each other.

As illustrated, restricted tubular outlet means communicates with the whirlpool chamber remote from inlet 47 and arranged to receive individual ones of the assembly parts moved by the gas jet. The tubular outlet means shown herein comprises a bank of outlet pipes 50 aligned in an axial direction, each outlet pipe having a diameter permitting only single assembly parts to pass therethrough and to be oriented along the axis of the pipes. The moving gas from the jet entering each outlet pipe from chamber 46 conveys the oriented assembly parts singly through the outlet pipes. As shown, the outlet pipes extend into whirlpool chamber 46 in a chordal direction and have inlet opening 51 in line with baffle means 46. The inlet opening extends obliquely to the axis of the outlet pipe in the direction of inlet 47 of chamber 46. Inlet openings 51 correspond to the smaller projected cross section of the singled assembly parts so that those assembly parts whose longitudinal axes are aligned with the axes of outlet pipes 50 at openings 51 will be blown into the pipes and oriented therein along the pipe axes. Oblique inlets 51 function as abutments for transversely positioned assembly parts which are, therefore, prevented for entering the outlet pipes and will fall back into the whirlpool chamber, thus assuring orientation of the singled parts.

Conveyor hoses 52 are connected to outlet pipes 50 for conveying the oriented assembly parts to packaging devices, assembly lines or storage stations.

In the illustrated embodiment, nipple 53 is connected by line 54 to a supply of air under pressure which may periodically be blown into outlet pipes 50 so that any entangled parts which may block inlet ends 51 may be blown back into chamber 46, thus assuring that the inlet ends are free to receive singled assembly parts.

Satisfactory singling in whirlpool chamber 46 depends on avoidance of overfilling of the chamber with clusters of assembly parts. If singled assembly parts are continuously withdrawn through conveyor hoses 52, the dosing of the parts supplied to chamber 46 may be adapted to their withdrawal therefrom by controlling the rotary speed of drum 40. If the withdrawal of parts from chamber 46 is seriously disrupted, sensors may be provided for stopping or slowing the drive of drum 40 when chamber 46 is overfilled and then switching the drum drive to its original speed when the filling of chamber 46 with assembly parts has fallen again below a predetermined value. Such sensors for the control of the amount of parts in chamber 46 may consist of light sources and photoelectric cells on opposite end walls of chamber 46 and arranged at a predetermined level in the upper part of chamber 46. With nozzles 48 in operation, the number of interruptions of the light beams by passing assembly parts is a measure of the degree of filling of chamber 46.

What is claim is:

1. An apparatus for separating individual assembly parts from a coherent mass of said parts and for orienting the individual assembly parts, which comprises
   (a) a rotary drum for storing the mass of said parts, the rotary drum including (1) a plurality of axially extending elongated support members for the stored mass of said parts, the support members constituting the peripheral wall of the drum and the support members being peripherally spaced from each other to define slot-shaped discharge opening therebetween, the openings having a width permitting single ones of the parts to pass therethrough by gravity and a length permitting a plurality of the parts to pass whereby clusters of said assembly parts resolved by rotation of the drum from the coherent mass and the individual parts pass through the openings by gravity, and means for rotating the drum (b) a housing of circular cross section defining whirlpool chamber arranged downstream of the rotary drum and having an inlet of a dimension permitting the clusters of assembly parts to be received and passed therethrough, the whirlpool chamber having an axis extending perpendicularly to the circular cross sectional plane of the housing, (c) a transfer passageway leading from the rotary drum to the inlet of the whirlpool chamber whereby the inlet is in communication with the peripheral drum openings, (d) nozzle means arranged at the inlet of the housing for directing a jet of gas into the whirlpool chamber in a direction substantially tangential to the circle defined by the housing, the tangential jet of gas creating a gaseous whirlpool in the chamber for moving and separating the clusters into individual assembly parts, and (e) conveyor means remote from the inlet and arranged to receive individual ones of said assembly parts moved by the gas jet, the conveyor means being arranged to orient the individual assembly parts.

2. The apparatus of claim 1, wherein the conveyor means comprises restricted tubular outlet means communicating with the whirlpool chamber and having a diameter permitting only single assembly parts to pass therethrough and to be oriented along the axis of the outlet means, and moving gas from the jet conveying the oriented assembly parts singly through the outlet means.

3. The apparatus of claim 1 or 2, further comprising baffle means arranged in the chamber in the path of the moving assembly parts between the inlet and the outlet means, the impact of the parts on the baffle means aiding in separating entangled ones of the assembly parts from each other.

4. The apparatus of claim 3, wherein the tubular outlet means extend into the whirlpool chamber in a chordal direction and the outlet means has an inlet opening in line with the baffle means, the inlet opening extending obliquely to the axis of the tubular outlet means in the direction of the inlet of the chamber.

* * * * *